(12) United States Patent
Lin

(10) Patent No.: US 7,925,296 B2
(45) Date of Patent: Apr. 12, 2011

(54) INTERGRATED COMMUNICATION APPARATUS

(75) Inventor: Pi-Fen Lin, Taipei (TW)

(73) Assignee: Sure Best Limited, Apia (WS)

( * ) Notice: Subject to any disclaimer, the term of this patent is extended or adjusted under 35 U.S.C. 154(b) by 1009 days.

(21) Appl. No.: 11/797,668

(22) Filed: May 7, 2007

(65) Prior Publication Data

US 2008/0280561 A1 Nov. 13, 2008

(51) Int. Cl.
*H04M 1/00* (2006.01)

(52) U.S. Cl. .......... 455/552.1; 455/41.2; 455/550.1; 455/553.1; 455/569.1; 455/575.1; 455/575.2; 455/90.1; 455/90.3; 455/74; 455/74.1

(58) Field of Classification Search ........ 455/41.1–41.2, 455/550.1, 552.1, 553.1, 557, 569.1–569.2, 455/570, 575.1, 575.2, 575.6, 575.9, 90.1–90.3, 455/74, 74.1

See application file for complete search history.

(56) References Cited

U.S. PATENT DOCUMENTS 7,327,981 B2 * 2/2008 Hundal ................ 455/41.2
2006/0166715 A1 * 7/2006 Van Engelen et al. ..... 455/575.2

* cited by examiner

*Primary Examiner* — Tuan A Tran
(74) *Attorney, Agent, or Firm* — Rosenberg, Klein & Lee

(57) ABSTRACT

An integrated communication apparatus is linked to the PSTN or the Internet for making a PSTN call or a VoIP call. The integrated communication apparatus includes a Bluetooth earphone having a signal transmitting terminal, and a body having an earphone receiving slot and a control circuit board. The earphone receiving slot is used for receiving the earphone and the signal transmitting terminal of the Bluetooth earphone is electrically connected with the control circuit board. The control circuit board includes a control module. The control module is connected with a Bluetooth module, a wireless VoIP module, a PSTN module, a voice-signal encoding/decoding circuit, a judging and charging circuit, and a voice-signal switching module for operating and controlling the modules and the circuits. The voice-signal switching module is connected with a speaker and a microphone via an ECHO eliminating circuit.

3 Claims, 8 Drawing Sheets

INTERGRATED COMMUNICATION APPARATUS

BACKGROUND OF THE INVENTION

1. Field of the Invention

The present invention relates to an integrated communication apparatus. In particular, this invention relates to a communication apparatus that combines a public switch telephone network (PSTN) and the Internet so that the user can make a call on the public switch telephone network or Voice over Internet Protocol (VoIP).

2. Description of the Related Art

Reference is made to FIG. 1, which shows a schematic diagram of a traditional telephone set. The telephone set 2 has a communication connecting wire 24 between the dialing host 20 and the transmitter 22. It uses a transmitting wire 26 to connect to the public switch telephone network (PSTN) 7. The user presses the key 28 on the host to make a call, links to a remote person via the PSTN 7, and communicates with the person via the transmitter 22.

However, due to wireless communication technology having been developed, the traditional structure of the dialing host 20 connecting with the transmitter 22 via the communication connecting wire 24 has been improved to become a wireless dialing transmitter 2' and a base station 20' both having wireless communicating functions. The wireless dialing transmitter 2' is linked to the base station 20' by a wireless method, as shown in FIG. 2. The base station 20' links to the PSTN 7. Therefore, users can make calls to one another.

Furthermore, because the Internet has become so wide spread in its use and popularity, VoIP has a wide bandwidth and is cheap. It is rapidly replacing expensive calls using the PSTN, such as long-distance calls or international calls. In short, VoIP and calls on PSTN are becoming more common.

Bluetooth communication also is also increasingly being applied to personal portable communication equipment, such as Bluetooth earphones, Bluetooth cell phones, etc. FIG. 3 shows the communication structure of a Bluetooth earphone and a Bluetooth cell phone. By using Bluetooth communication technology, a voice signal S1 of an incoming call for the Bluetooth cell phone 3 is transmitted to the Bluetooth earphone 1 in a wireless manner. The voice signal S2 that is to be transmitted is transmitted to the Bluetooth cell phone 3 via the Bluetooth earphone 1 by using Bluetooth communication technology. Therefore, voices of the users can be transmitted in two directions. The user can receive a call anywhere, without having to hold on to his or her cell phone.

However, when an incoming call arrives, the Bluetooth earphone 1 merely allows one user to receive the call, a third person cannot join the call. It is inconvenient for in situations when multiple users wish to participate in a phone conversation.

Because users wish to have excellent communication quality, a communication apparatus that combines the public switch telephone network and the Internet so that users can make calls on the public switch telephone network or voice over Internet protocol is required. Users also wish to receive calls anywhere without holding their transmitter, and communicate with a third person or more if necessary.

SUMMARY OF THE INVENTION

One particular aspect of the present invention is to provide an integrated communication apparatus that combines a public switch telephone network (PSTN) and the Internet so that a user can make a call on the public switch telephone network or voice over Internet protocol. It also combines with a Bluetooth earphone so that the user does not need to hold the receiver. The integrated communication apparatus also has a speaker function so that a third person can join the call.

The integrated communication apparatus includes a Bluetooth earphone having a signal transmitting terminal, and a body having an earphone receiving slot and a control circuit board. The earphone receiving slot is used for receiving the earphone. When the Bluetooth earphone is received in the earphone receiving slot, the signal transmitting terminal of the Bluetooth earphone is electrically connected with the control circuit board.

The control circuit board includes a control module, a Bluetooth module, a wireless VoIP module, a PSTN module, a voice-signal encoding/decoding circuit, a judging and charging circuit, a voice-signal switching module, a speaker, a microphone, and an ECHO eliminating circuit.

The Bluetooth module is connected with a control module that can perform wireless voice communication with the earphone. The wireless VoIP module is connected with the control module and is linked to the Internet for providing VoIP communication. The PSTN module is connected with the control module and is linked to the PSTN for providing call communication. The voice-signal encoding/decoding circuit is connected with the control module and the Bluetooth module for converting the analog voice-signal and the digital voice-signal. The judging and charging circuit is connected with the control module for determining whether the Bluetooth earphone is received in the earphone receiving slot, and charging the Bluetooth earphone when the Bluetooth earphone is received in the earphone receiving slot. The voice-signal switching module is connected with the control module, the PSTN module, and the voice-signal encoding/decoding circuit. The voice-signal switching module is controlled by the control module to switch the voice-signal transmission path. The ECHO eliminating circuit is connected with the voice-signal switching module, the speaker and the microphone for eliminating ECHO generated from the speaker and the microphone.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 4:
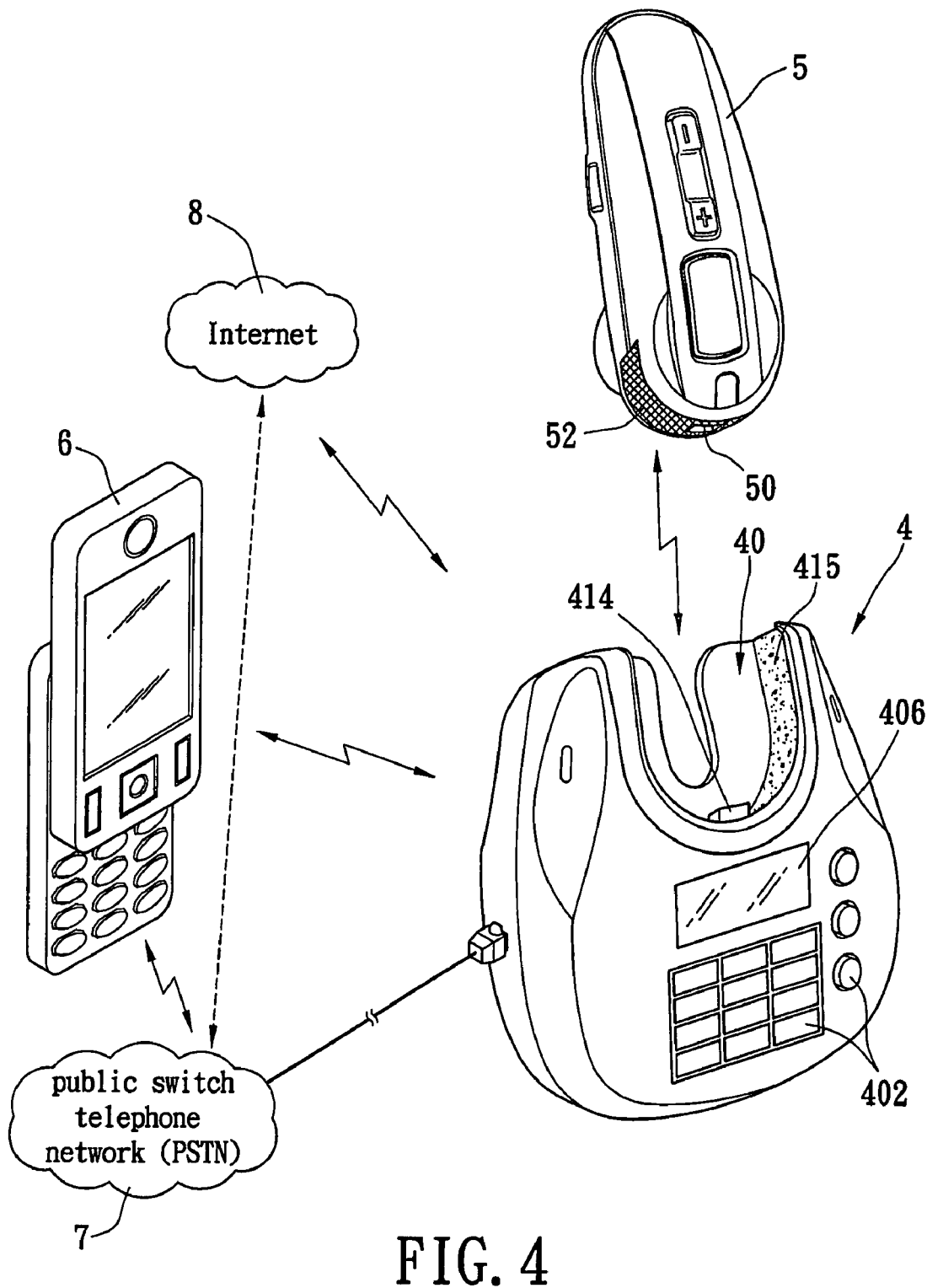
FIG. 4 is a schematic diagram of the appearance of the first embodiment of the present invention.

Reference is made to FIG. 4, which shows a schematic diagram of the appearance of the first embodiment of the present invention. The integrated communication apparatus includes a Bluetooth earphone 5 and a body 4. The body 4 is linked to a PSTN 7 by a wired method and linked to an Internet 8 by a wireless method that can make a call on the PSTN 7 or a VoIP on the Internet 8. The body 4 can also perform wireless communication with a remote Bluetooth cell phone 6 via the Bluetooth wireless communication technology. Thereby, the user can make a call without holding his or her cell phone.

The body 4 integrates the PSTN communicating function, the VoIP communicating function and the wireless communicating function of the Bluetooth cell phone 6 therein to satisfy the user's requirements. The user can dial the phone number and select the above communicating function by using the key module. A screen 406 on the body 4 can display a battery power status, a charging status, a phone number, and a list of phone numbers, etc.

Figure 1:
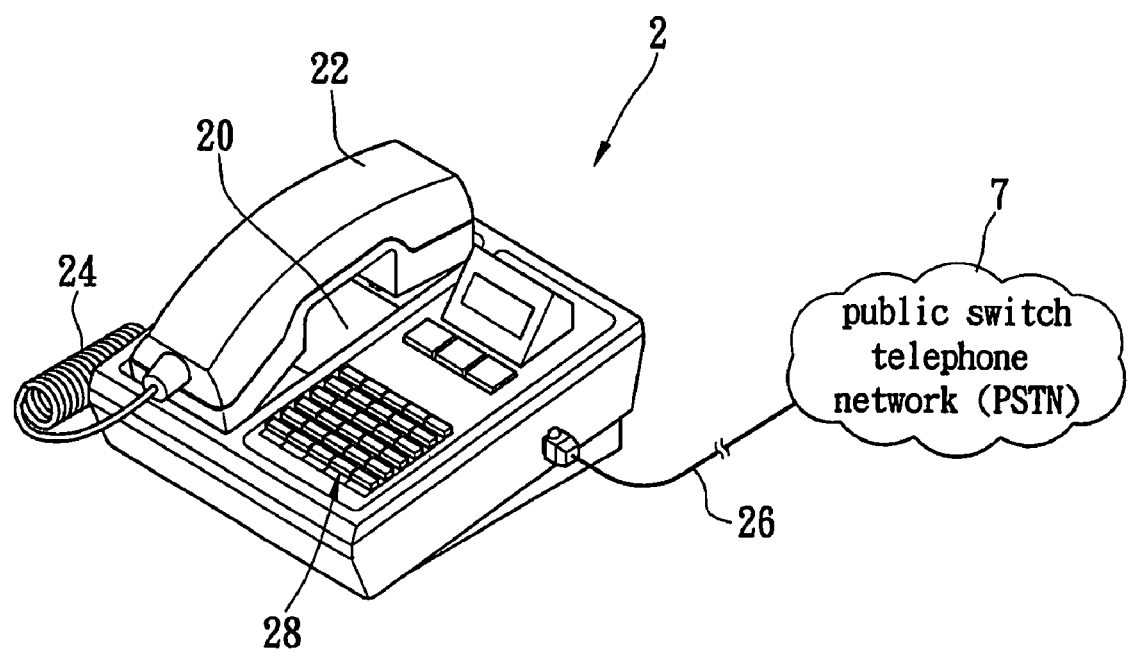
FIG. 1 is a schematic diagram of a traditional telephone set.
Figure 2:
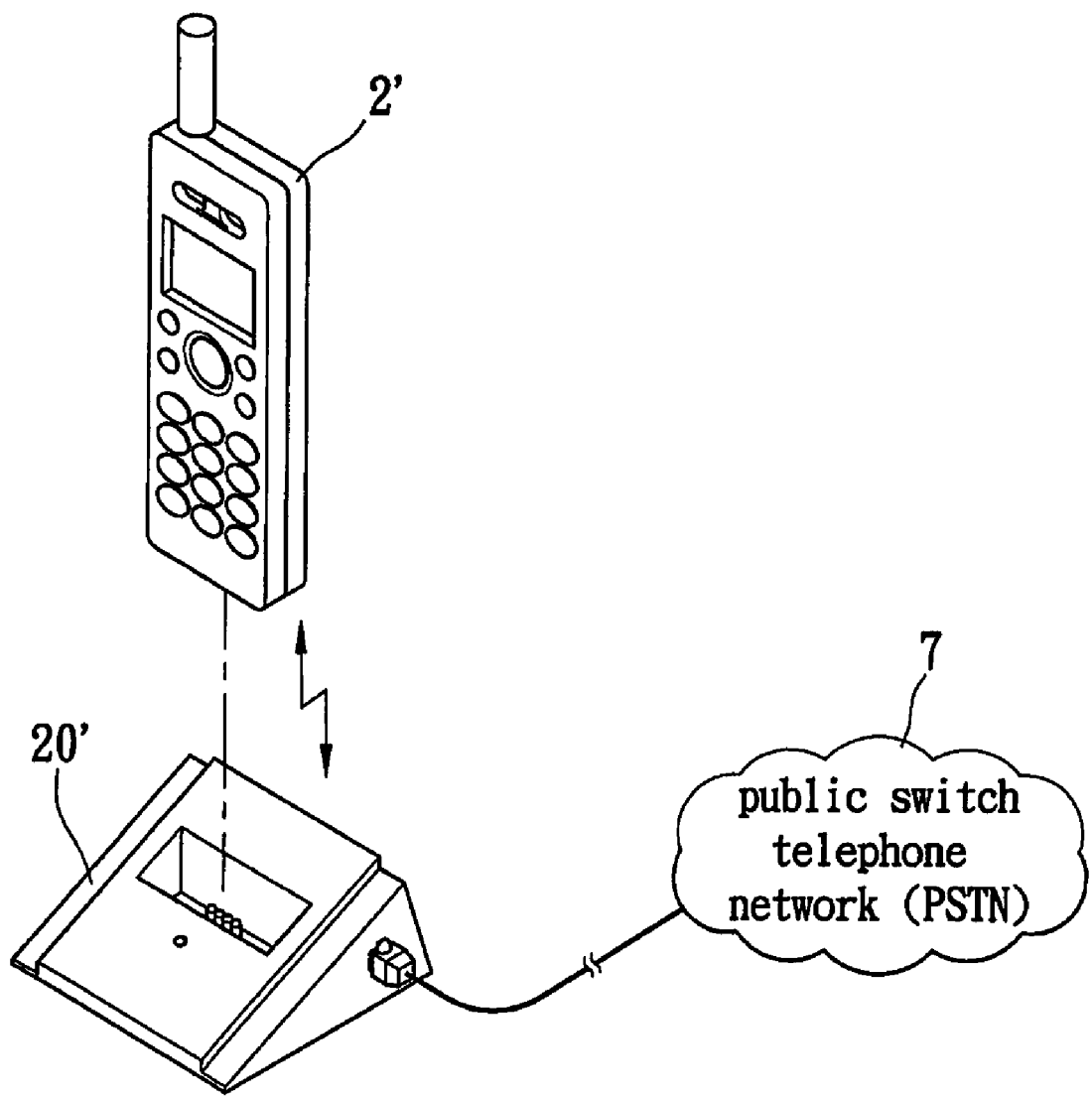
FIG. 2 is a schematic diagram of the traditional wireless telephone set.
Figure 3:
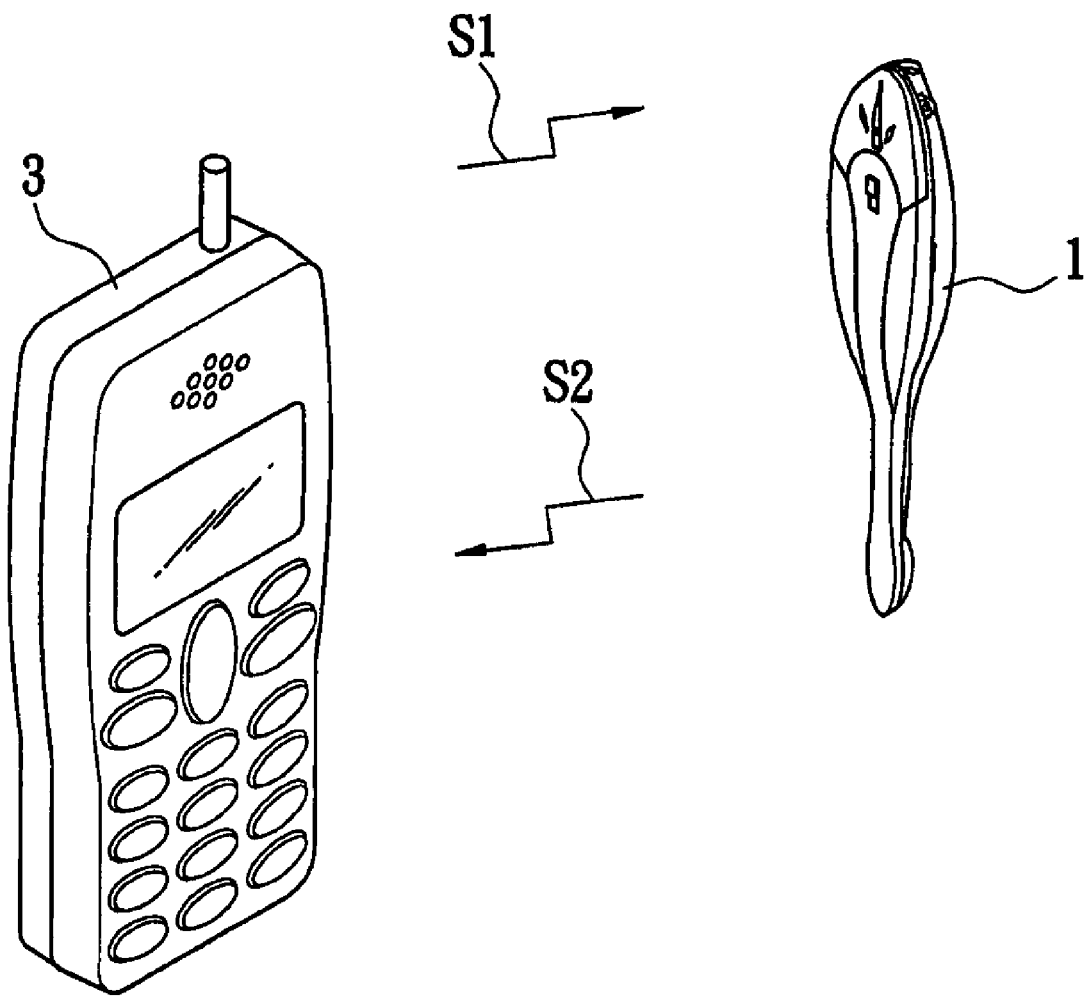
FIG. 3 is a schematic diagram of the communication structure of the Bluetooth earphone and the Bluetooth cell phone of the prior art.

The present invention uses the Bluetooth earphone 5 to make a call so that the user does not need to hold the transmitter. Furthermore, the body 4 has the speaker function so that the third person can join the call. In FIG. 4, The Bluetooth earphone 5 has a signal transmitting terminal 50 and the body 4 has an earphone receiving slot 40 and a control circuit board (not labeled). The Bluetooth earphone 5 is received and positioned in the earphone receiving slot 40, as shown in FIG. 3, which shows another schematic diagram of the appearance of the present invention. When the Bluetooth earphone 5 is combined with the body 4, the signal transmitting terminal 50 of the Bluetooth earphone 5 is electrically connected with the control circuit board via an electrical connector 414 on the body 4. The electrical connector 414 can be a USB transmission interface.

Reference is made to FIG. 4 again. In order to rapidly connect the Bluetooth earphone 5 with the body 4, the Bluetooth earphone 5 further includes an absorbable element 52, and a magnetic element 415 in the earphone receiving slot 40 of the body 4. When the Bluetooth earphone 5 approaches the earphone receiving slot 40 of the body 4, the magnetic attracting effect generated from the magnetic element 415 is used for attracting the absorbable element 52 of the tooth earphone 5. Thereby, the Bluetooth earphone 5 is rapidly received in the earphone receiving slot 40, and the signal transmitting terminal 50 of the Bluetooth earphone 5 is electrically connected with the electrical connector 414 of the body 4. The electrical connector 414 is a transmission joint interface.

Figure 6:
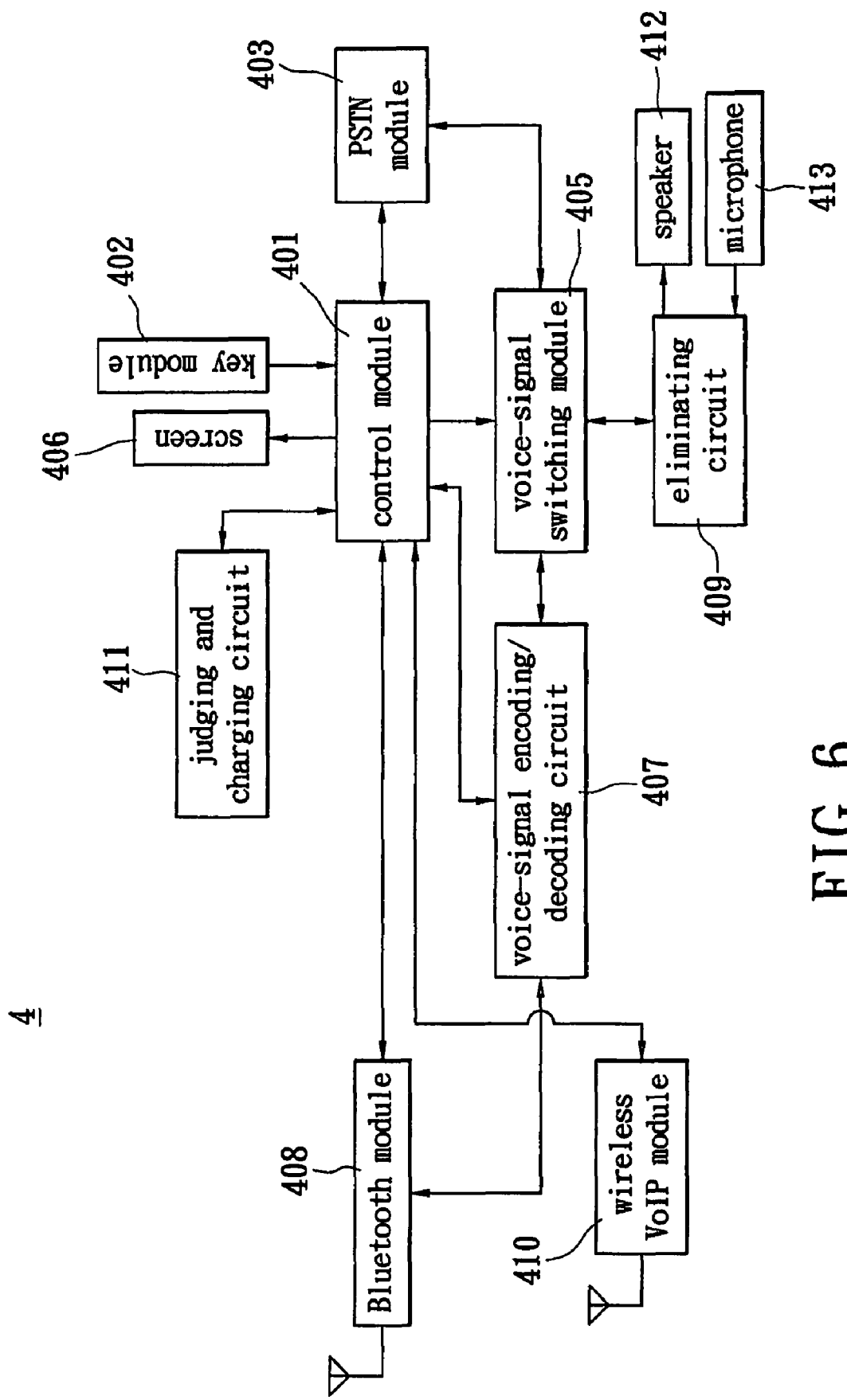
FIG. 6 is a block diagram of the circuit of the first embodiment of the present invention.

Reference is made to FIG. 6, which shows a block diagram of the circuit of the first embodiment of the present invention. The integrated communication apparatus includes a Bluetooth earphone 5 and a body 4. The control circuit board in the body 4 includes a control module 401, a Bluetooth module 408, a wireless VoIP module 410, a PSTN module 403, a voice-signal encoding/decoding circuit 407, a judging and charging circuit 411, a voice-signal switching module 405, a speaker 412, a microphone 413, and a ECHO eliminating circuit 409.

Reference is made to FIGS. 4 and 6. The Bluetooth module 408 is used for performing wireless voice communication with the Bluetooth earphone 5 or the Bluetooth cell phone 6. The wireless VoIP module 410 is linked to the Internet 8 for providing VoIP communication. The PSTN module 403 is linked to the PSTN 7 for providing call communication over the PSTN 7. The voice-signal encoding/decoding circuit 407 is connected with the Bluetooth module 408 for converting the analog voice-signal and the digital voice-signal. The judging and charging circuit 4 determines whether the Bluetooth earphone 5 is received in the earphone receiving slot 40, and charges the Bluetooth earphone 5 when the Bluetooth earphone 5 is received in the earphone receiving slot 40. The voice-signal switching module 405 is connected with the voice-signal encoding/decoding circuit 407 and the PSTN module 7 for switching the voice-signal transmission path. The ECHO eliminating circuit 409 is connected with the voice-signal switching module 405, the speaker 412, and the microphone 413 for eliminating ECHO generated from the speaker 412 and the microphone 413.

Reference is made to FIG. 6 again. The control module 401 is connected with the Bluetooth module 408, the wireless VoIP module 410, the PSTN module 403, the voice-signal encoding/decoding circuit 407, the judging and charging circuit 411, and the voice-signal switching module 405. The control module 401 is controlled by a system control software to control the above modules and circuits.

Reference is made to FIG. 6 again. The control module 401 is further connected with a screen 406, and a key module 402. The control module 401 controls the screen 406 to display the battery power status, the charging status, the phone number, and the phone number list etc. The key module 402 provides a variety of instructions to the control module 401 to control the control module 401 to perform related operations, such as dialing a phone number, selecting a voice-signal transmission path, and selecting a communication network, etc.

Figure 5:
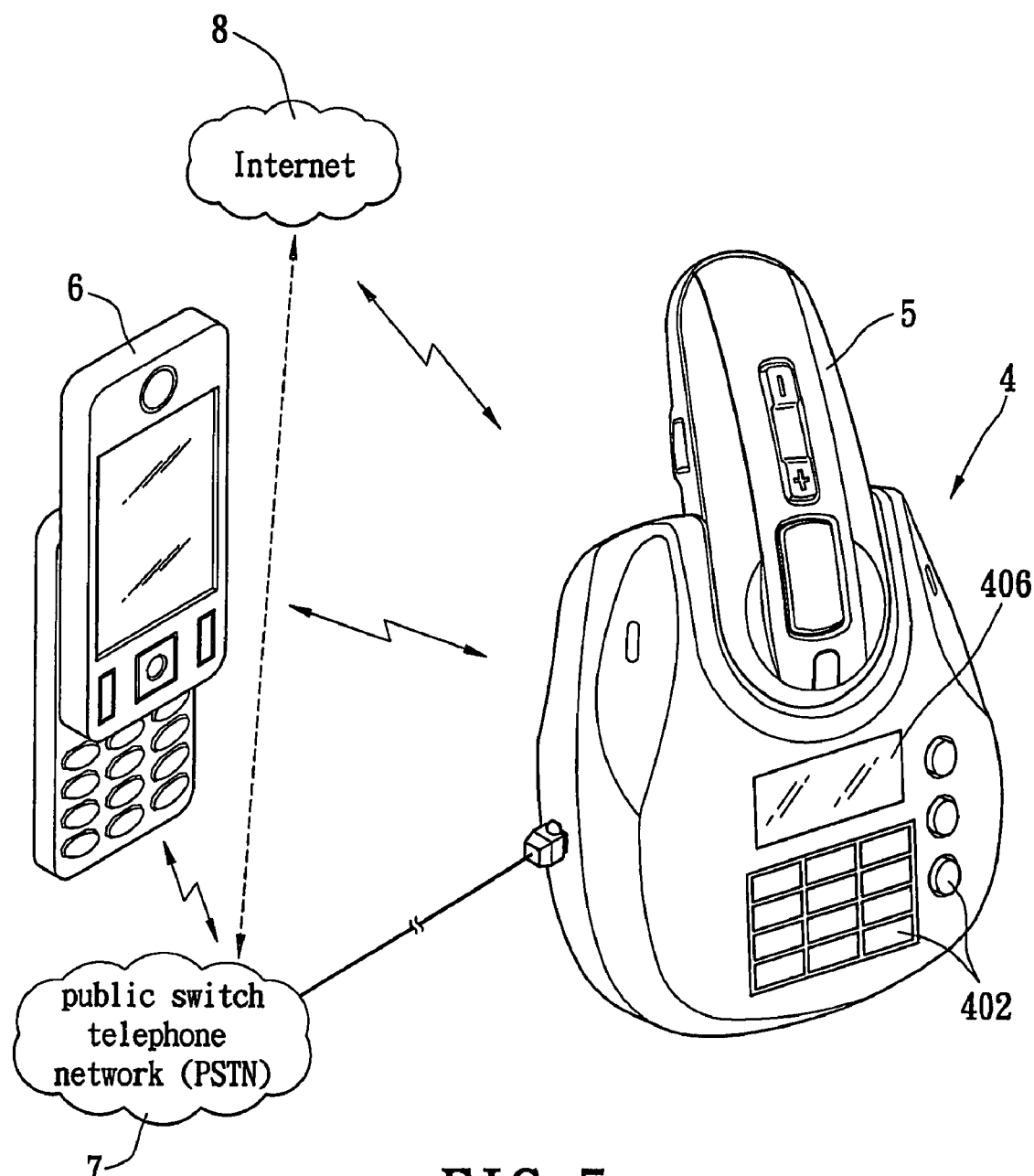
FIG. 5 is another schematic diagram of the appearance of the first embodiment of the present invention.

Reference is made to FIGS. 5 and 6. The control module 401 is indicated by functional instructions from the key module 402 to control the Bluetooth module 408, the wireless VoIP module 410, the PSTN module 403, the voice-signal encoding/decoding circuit 407 and the voice-signal switching module 405. When the functional instruction is to dial or receive a PSTN call, the control module 401 controls the PSTN module 403 to link with the PSTN 7 for providing a PSTN call communication service. At this time, the control module 401 also controls the voice-signal switching module 405 so that the PSTN module 403, the speaker 412 and the microphone 413 form a voice-signal transmission path via the ECHO eliminating circuit 409. Therefore, the user dials or receives a PSTN call via the PSTN 7, and a third person can join the call.

Reference is made to FIGS. 4 and 6. When the user wishes to make a call in private, the user can take the Bluetooth earphone 5 from the body 4 and use the Bluetooth earphone 5 to make a private call. At this time, the judging and charging circuit 411 issues an informing instruction to the control module 401 to inform the control module 401 that the Bluetooth earphone 5 has been separated from the body 4. After the control module 401 acquires the information regarding the Bluetooth earphone 5 having separated from the body 4, the control module 401 controls the voice-signal switching module 405 to switch the voice-signal transmission path. The PSTN module 403 and the Bluetooth module 408 form a voice-signal transmission path via the voice-signal encoding/decoding circuit 407. At this time, the control module 401 controls the Bluetooth module 408 to make a voice wireless transmission with the Bluetooth earphone 5, and the private call can be made.

Furthermore, the user can also operate the key module 402 to indicate the control module 401 to control the voice-signal switching module 405 for switching the voice-signal transmission path. Thereby, the PSTN module 403, the speaker 412, and the microphone 413 form a voice-signal transmission path via the ECHO eliminating circuit 409. Similarly, the PSTN module 403 and the Bluetooth module 408 form another voice-signal transmission path via the voice-signal encoding/decoding circuit 407. Therefore, the user dials or receives a PSTN call via the PSTN 7 by using both the voice-signal transmission paths, and a third person can join the call or a private call can be made.

Reference is made to FIGS. 5 and 6. The control module 401 is indicated by the functional instruction of the key module 402. When the functional instruction is to dial or receive a VoIP call, the control module 401 controls the wireless VoIP module 410 to link with the Internet 8 for providing a VoIP call communication service. At this time, the control module 401 also controls the voice-signal switching module 405 so that the wireless VoIP module 410, the speaker 412, and the microphone 413 form a voice-signal transmission path via the control module 401 and the voice-signal encoding/decoding circuit 407. Therefore, the user dials or receives a VoIP call via the Internet 8, and the third person can join the call.

Reference is made to FIGS. 4 and 6. When the user wishes to make a call in private, the user can take the Bluetooth earphone 5 from the body 4 and use the Bluetooth earphone 5 to make a private call. At this time, the judging and charging circuit 411 issues an informing instruction to the control module 401 to inform the control module 401 that the Bluetooth earphone 5 has been separated from the body 4. After the control module 401 acquires the information that the Bluetooth earphone 5 has separated from the body 4, the control module 401 controls the voice-signal switching module 405 to switch the voice-signal transmission path. The wireless VoIP module 410 and the Bluetooth module 408 form a voice-signal transmission path via the control module 401 and the voice-signal encoding/decoding circuit 407. At this time, the control module 401 controls the Bluetooth module 408 to make a voice wireless transmission with the Bluetooth earphone 5, and a private call can also be made.

Furthermore, the user can also operate the key module 402 to indicate the control module 401 to control the voice-signal switching module 405 for switching the voice-signal transmission path. Thereby, the wireless VoIP module 410, the speaker 412, and the microphone 413 form a voice-signal transmission path via the control module 401 and the voice-signal encoding/decoding circuit 407. Similarly, the wireless VoIP module 410 and the Bluetooth module 408 form another voice-signal transmission path via the control module 401 and the voice-signal encoding/decoding circuit 407. Therefore, the user dials or receives a VoIP call via the Internet 8 by using both the voice-signal transmission paths, and a third person can join the call, and the private call can also be made.

Reference is made to FIGS. 5 and 6. The control module 401 is indicated by the functional instruction of the key module 402. When the functional instruction is to dial or receive a call via the Bluetooth cell phone 6, the control module 401 controls the Bluetooth module 408 to link with the Bluetooth cell phone 6 for providing a wireless communication service. At this time, the control module 401 also controls the voice-signal switching module 405 so that the Bluetooth module 408, the speaker 412, and the microphone 413 form a voice-signal transmission path via the voice-signal encoding/decoding circuit 407. Therefore, the user dials or receives a call via the Bluetooth cell phone, and a third person can join the call.

Reference is made to FIGS. 4 and 6. When the user wishes to make a call in private, the user can take the Bluetooth earphone 5 from the body 4 and use the Bluetooth earphone 5 to make a private call. At this time, the judging and charging circuit 411 issues an informing instruction to the control module 401 to inform the control module 401 that the Bluetooth earphone 5 has been separated from the body 4. After the control module 401 acquires the information that the Bluetooth earphone 5 has been separated from the body 4, the control module 401 controls the voice-signal switching module 405 to cut off the voice-signal transmission path built by the speaker 412, and the microphone 413. The control module 401 controls the Bluetooth module 408 to make a voice wireless transmission with the Bluetooth earphone 5, and a private call can also be made.

Furthermore, the user can also operate the key module 402 to indicate the control module 401 to control the voice-signal switching module 405 for switching the voice-signal transmission path. Thereby, the Bluetooth module 408, the speaker 412, and the microphone 413 form a voice-signal transmission path via the voice-signal encoding/decoding circuit 407. Similarly, the Bluetooth module 408 can make a voice wireless transmission with the Bluetooth earphone 5 so that the user dials or receives a call via the Bluetooth cell phone 6, and a third person can join the call, and a private call can also be made.

Figure 7:
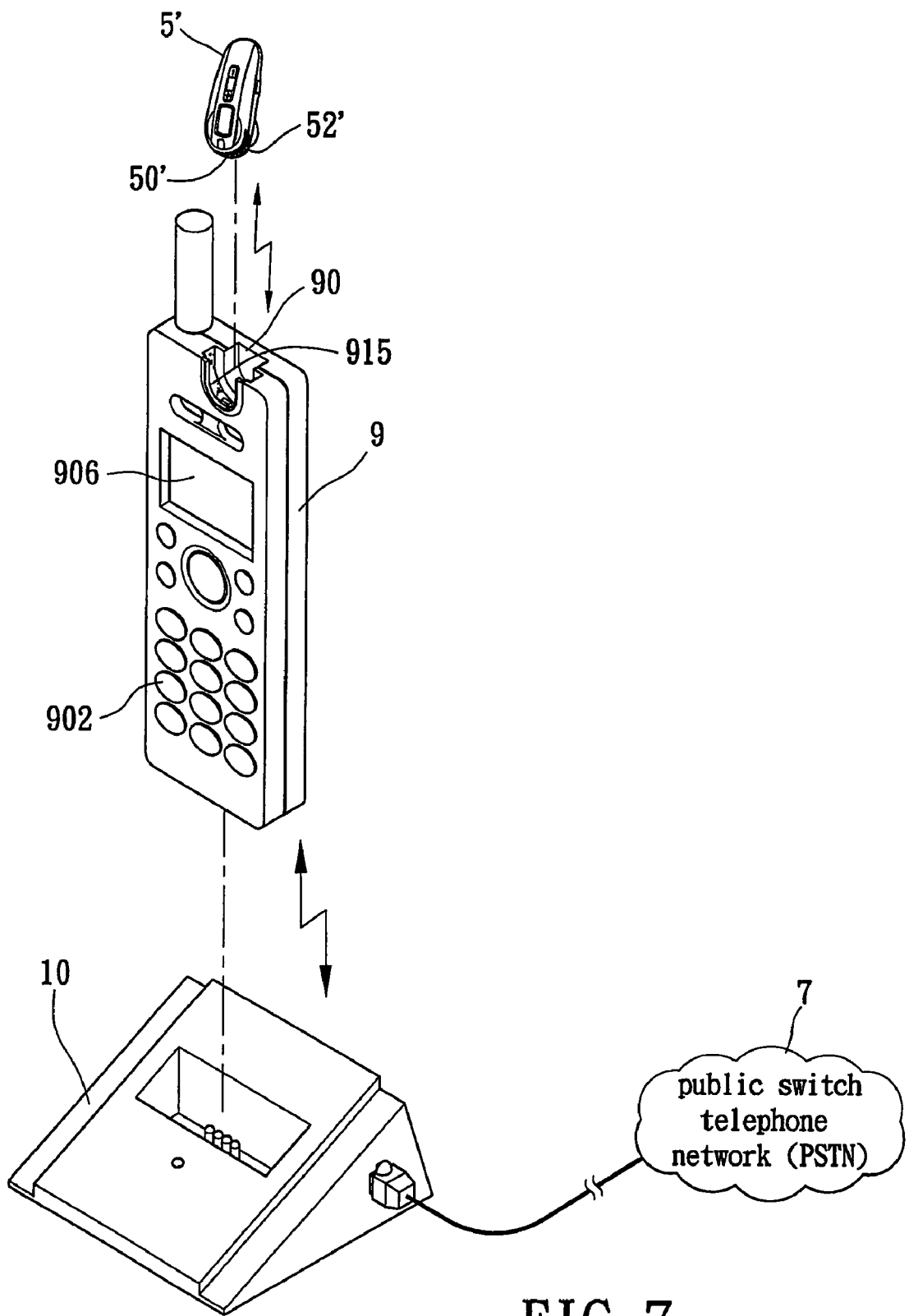
FIG. 7 is a schematic diagram of the appearance of the second embodiment of the present invention.

Reference is made to FIG. 7, which shows a schematic diagram of the appearance of the second embodiment of the present invention. The integrated communication apparatus includes a Bluetooth earphone 5' and a wireless telephone set body 9. The wireless telephone set body 9 is linked to a base 10, and the base 10 is linked to the PSTN 7 using a wired method. The wireless telephone set body 9 uses Bluetooth communication technology to link with the base 10 and the Bluetooth earphone 5' by a wireless method to make a PSTN call.

Furthermore, the user can use a key module 902 located on the wireless telephone set body 9 to dial the telephone number or select the communicating functions. A screen 906 on the wireless telephone set body 9 can display the battery power status, the charging status, the dialing number, and the number list, etc. The present invention further uses the Bluetooth earphone 5' to make a call so that the user does not need to hold the receiver.

In FIG. 7, the Bluetooth earphone 5' has a signal transmitting terminal 50' and the wireless telephone set body 9 has an earphone receiving slot 90 and a control circuit board (not labeled). The Bluetooth earphone 5' can be received and positioned in the earphone receiving slot 90. When the Bluetooth earphone 5' is combined with the wireless telephone set body 9, the signal transmitting terminal 50' of the Bluetooth earphone 5' is electrically connected with the control circuit board of the wireless telephone set body 9.

Reference is made to FIG. 7 again. In order to rapidly connect the Bluetooth earphone 5' with the wireless telephone set body 9, the Bluetooth earphone 5' further includes an absorbable element 52', and a magnetic element 915 in the earphone receiving slot 90 of the wireless telephone set body 9. When the Bluetooth earphone 5' approaches the earphone receiving slot 90 of the wireless telephone set body 9, the magnetic attraction generated by the magnetic element 915 is used to attract the absorbable element 52' of the tooth earphone 5'. Thereby, the Bluetooth earphone 5' is rapidly received in the earphone receiving slot 90, and the signal transmitting terminal 50' of the Bluetooth earphone 5' is electrically connected with the control circuit board of the wireless telephone set body 9.

Figure 8:
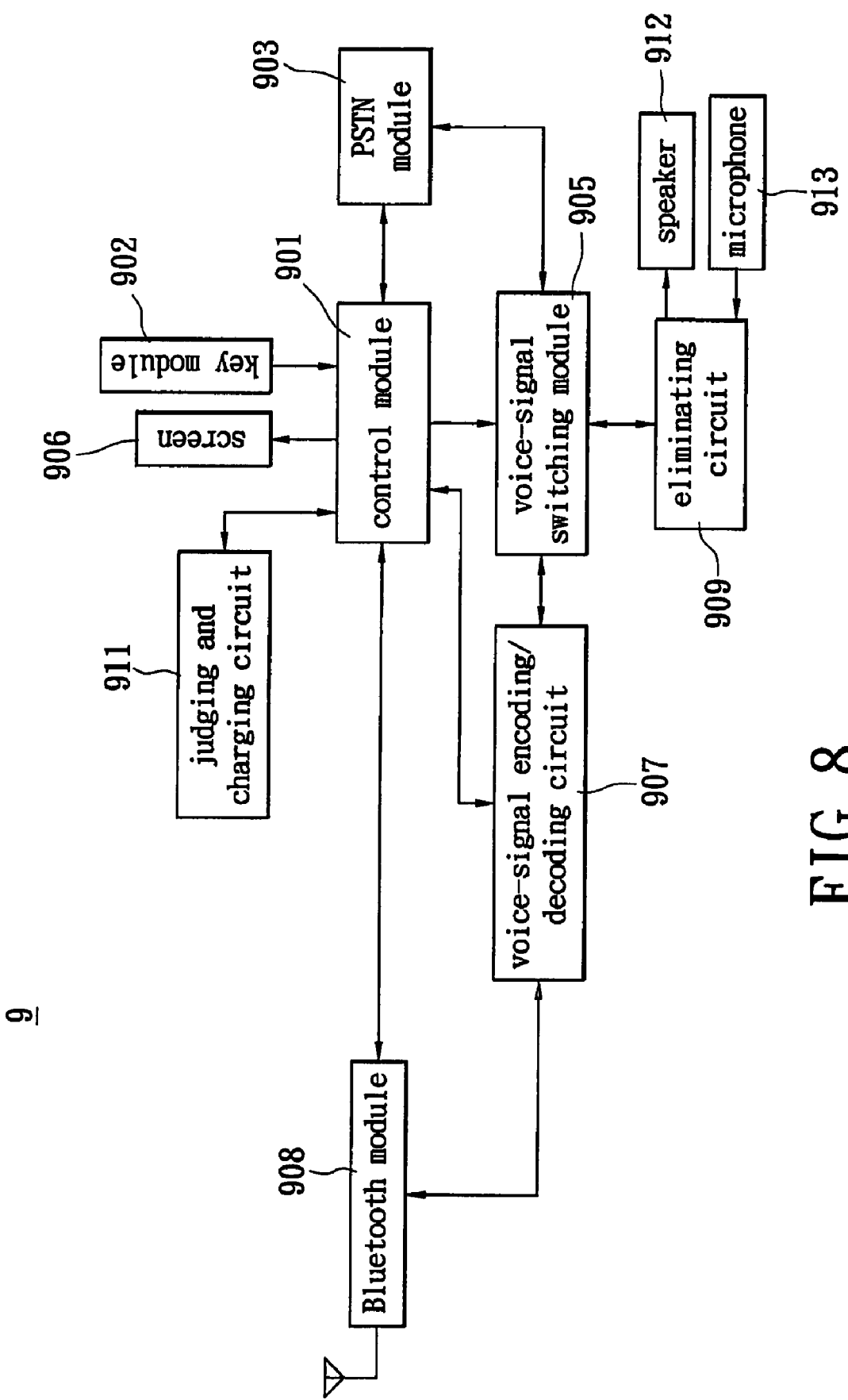
FIG. 8 is a block diagram of the circuit of the second embodiment of the present invention.

Reference is made to FIG. 8, which shows a block diagram of the circuit of the second embodiment of the present invention. The control circuit board in the wireless telephone set body 9 includes a control module 901, a Bluetooth module 908, a PSTN module 903, a voice-signal encoding/decoding circuit 907, a judging and charging circuit 911, a voice-signal switching module 905, a speaker 912, a microphone 913, and a ECHO eliminating circuit 909.

Referring to FIG. 6, the difference between the second embodiment and the first embodiment is that there is no wireless VoIP module 410 in the second embodiment. Therefore, the second embodiment can merely link with the PSTN 7 to make or receive a PSTN call.

The integrated communication apparatus combines a public switch telephone network (PSTN) and the Internet so that the user can make a call on the public switch telephone network or voice over Internet protocol. It also combines the Bluetooth earphone so that the user does not need to hold the receiver. The integrated communication apparatus also has the speaker function so that a third person can join the call. The present invention has the following characteristics:

1. The integrated communication apparatus can utilize the PSTN or the Internet individually or simultaneously to make a call, and match the communication system so that a third person can join the call.

2. The Bluetooth earphone and the body can be operated together, and match the communication system so that a third person can join the call.

3. The Bluetooth earphone and the body can be operated individually, and match the communication system so that a third person can join the call.

The present invention provides a variety of communicating functions that can be selected by the user according to their needs. Moreover, the communication quality is improved.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. An integrated communication apparatus, linked with a public switch telephone network (PSTN) for making a PSTN call, comprising:
   a Bluetooth earphone having a signal transmitting terminal; and
   a wireless telephone set body having an earphone receiving slot for receiving the Bluetooth earphone and a control circuit board electrically connected with the signal transmitting terminal of the Bluetooth earphone, wherein the control circuit board comprises:
   a control module;
   a Bluetooth module connected with the control module, wherein the Bluetooth module performs a wireless voice communication with the Bluetooth earphone;
   a PSTN module connected with the control module, wherein the PSTN module links to the PSTN for providing a PSTN call communication service;
   a voice-signal encoding/decoding circuit connected with the control module and the Bluetooth module, wherein the voice-signal encoding/decoding circuit converts an analog voice-signal and a digital voice-signal;
   a judging and charging circuit connected with the control module, wherein the judging and charging circuit determines whether the Bluetooth earphone is received in the earphone receiving slot, and charges the Bluetooth earphone when the Bluetooth earphone is received in the earphone receiving slot;
   a voice-signal switching module connected with the control module, the PSTN module and the voice-signal encoding/decoding circuit, wherein the voice-signal switching module is controlled by the control module to switch a voice-signal transmission path;
   a speaker;
   a microphone; and
   an ECHO eliminating circuit connected with the voice-signal switching module, the speaker and the microphone, wherein the ECHO eliminating circuit is used for eliminating ECHO generated from the speaker and the microphone;
   wherein the Bluetooth earphone further comprises an absorbable element, and a magnetic element in the earphone receiving slot of the body for attracting the absorbable element of the tooth earphone when the Bluetooth earphone approaches the earphone receiving slot so as to ensure that the Bluetooth earphone is received in the earphone receiving slot and the signal transmitting terminal of the Bluetooth earphone is electrically connected with a control circuit board of the body.

2. The integrated communication apparatus as claimed in claim 1, further comprising a screen, wherein the screen is connected with the control module for displaying the battery power status, the charging status, the phone number, and the phone number list.

3. The integrated communication apparatus as claimed in claim 1, further comprising a key module, wherein the key module is connected with the control module for providing a phone number or a variety of functional instructions to the control module.

* * * * *

UNITED STATES PATENT AND TRADEMARK OFFICE
CERTIFICATE OF CORRECTION

PATENT NO. : 7,925,296 B2  Page 1 of 1
APPLICATION NO. : 11/797668
DATED : April 12, 2011
INVENTOR(S) : Pi-Fen Lin It is certified that error appears in the above-identified patent and that said Letters Patent is hereby corrected as shown below:

ON THE TITLE PAGE ITEM (54), AND COL. 1, LINE 1, DELETE THE TITLE "INTERGRATED COMMUNICATION APPARATUS" AND INSERT THEREFOR: --INTEGRATED COMMUNICATION APPARATUS--.

Signed and Sealed this
Seventh Day of June, 2011

David J. Kappos
*Director of the United States Patent and Trademark Office*